(No Model.)
W. T. FAIZEY.
VEHICLE WHEEL.
No. 587,191. Patented July 27, 1897.
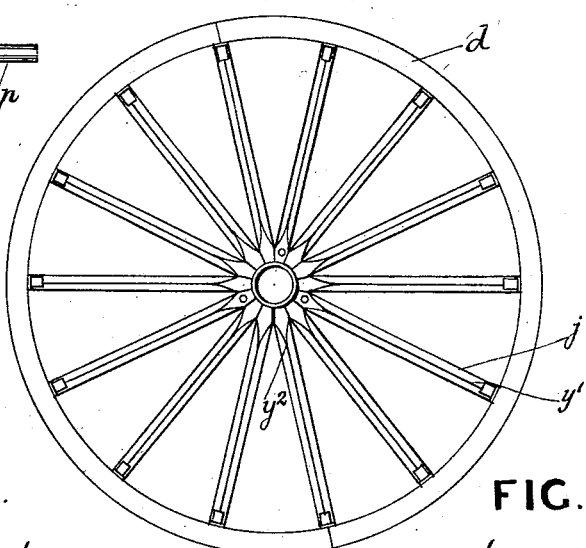
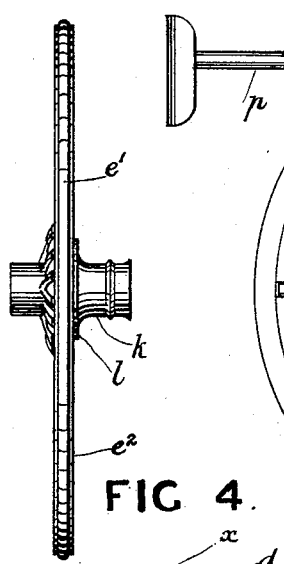
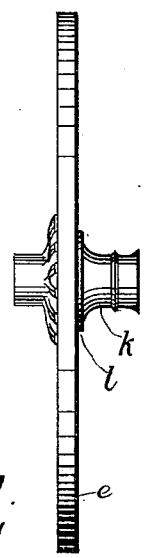
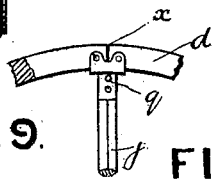
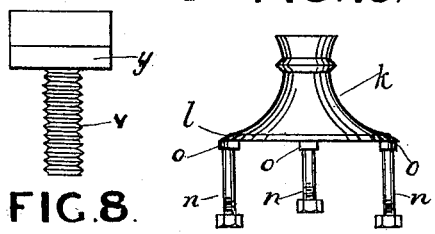
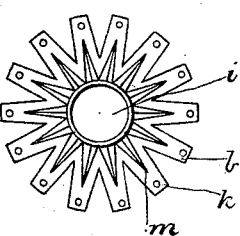
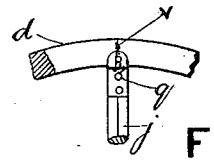
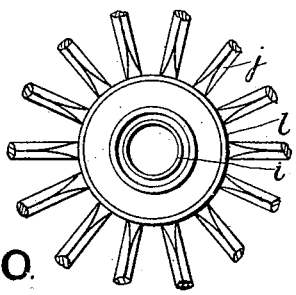
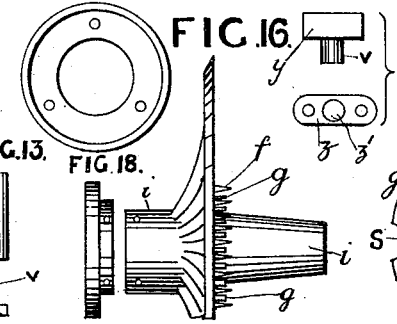
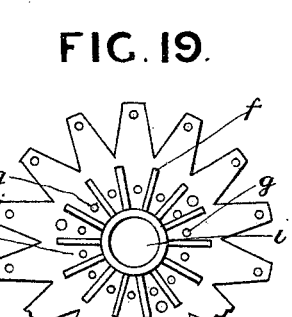
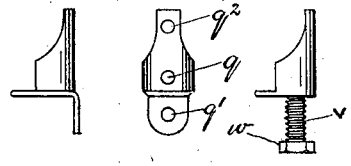
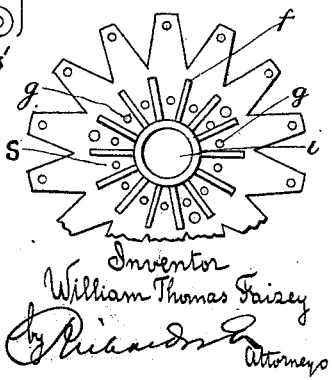
Witnesses
H. van Oldenneel
E. A. Scott
Inventor
William Thomas Faizey
by Richardson
Attorneys

UNITED STATES PATENT OFFICE.

WILLIAM THOMAS FAIZEY, OF ASTLEY ABBOTS, ENGLAND, ASSIGNOR TO RICHARD NICHOLAS AND ERNEST TREVOR, OF BRIDGENORTH, ENGLAND.

VEHICLE-WHEEL.

SPECIFICATION forming part of Letters Patent No. 587,191, dated July 27, 1897.

Application filed October 3, 1896. Serial No. 607,776. (No model.) Patented in England January 7, 1896, No. 391.

*To all whom it may concern:*

Be it known that I, WILLIAM THOMAS FAIZEY, wheelwright, a subject of the Queen of Great Britain, of Cross-Lane-Head, Astley Abbots, near Bridgenorth, in the county of Salop, England, have invented certain new and useful Adjustable Wheels for all Kinds of Vehicles, (for which I have obtained British Patent No. 391, January 7, 1896,) of which the following is a full, clear, and exact description.

My invention has for its object adjustable wheels for all kinds of vehicles, consisting of a metallic hub made in two sections, into which wood or metallic spokes fit, surrounded by wood or metallic fellies or rims, the said fellies or rims being connected to the spokes by metallic sockets.

The object of my invention is to provide rigid wheels built on an interchangeable principle and which are more or less adjustable and also simple to repair, being constructed of wood and metal or any other suitable materials that may be preferred for all kinds of vehicles.

In order that my invention may be clearly understood, I will now proceed to describe the drawings accompanying this specification. Letters in duplicate marked thereon refer to similar parts throughout the several diagrams. Certain parts in some figures are represented as broken off for convenience.

Figure 1 is a side elevation of a wheel with the front disk off. Fig. 2 is a front elevation of a wheel with india-rubber tire. Fig. 3 is a front elevation of a wheel with metallic tire. Fig. 4 shows a portion of felly or rim with joint over center of spoke. Fig. 5 shows the back of the hub. Fig. 6 shows the front of the hub with attached spokes broken off. Fig. 7 shows a portion of the felly or rim with a spoke attached. Fig. 8 is a back view of adjustable socket for connecting spoke to joint of felly or rim. Fig. 9 represents a plain socket with bolt to screw into felly or rim. Fig. 10 represents a plain socket with a shank and corresponding plate for the shank to fit into. Fig. 11 is a side view of adjustable socket. Fig. 12 is a view of the inside of adjustable socket. Fig. 13 is a side view of adjustable socket with bolt and nut attached. Fig. 14 is a side view of front section of adjustable socket with bolt or rivet attached. Fig. 15 represents the front of the hub with bolts attached. Fig. 16 is a side elevation of the back of the hub, showing internal arrangements for the spokes. Fig. 17 is a plan of back flange, showing holes for bolts to secure the wheel to ordinary mail-axle. Fig. 18 is a side elevation of back flange, showing holes for rivets to secure it to the tube of the hub. Fig. 19 is a front elevation of back of hub, showing internal arrangements for the spokes.

The hubs or naves of the wheels will be adjustable and will be of metal made in two sections, a division occurring between the front, Fig. 15, and the back, Fig. 5, of the hub. The back section of disk, Fig. 5, is formed on its outer periphery into a number of graduated projections $b$, so as to give additional support to the spokes $j$, such being carried a suitable distance up the back of the spokes $j$, which are severally secured to each projection $b$ by a screw, rivet, or bolt $h$ and such like, and it is cast with the pipe or tube $i$, which forms the receptacle for the bearings or axle-boxes. The internal arrangements in connection with the back disk, Fig. 16, consist of a number of spikes or pegs $g$, alternating with a number of projecting pieces $f$, according to the number of spokes used in a wheel. These projecting pieces $f$ are in shape like a wedge, the thick end being next to the back disk, Fig. 16, and they form the mortises $s$ for the spokes $j$. The spike or peg $g$ is between each projecting wedge-shaped piece $f$. The front disk $l$ can be made exactly like the back disk, Fig. 19, or, if preferable, without the projections $b$ formed on its outer periphery, and it is also intended for some wheels to make the inside of the front disk quite plain with a circular projection or head to fit into a corresponding depression or groove formed in the front of the spokes $j$. A boss $o$ is left on the inside of the disk $l$ to screw the bolts or screws $n$ into, or, if preferable, the bolts or screws can be carried entirely through the disk $l$. Any number of bolts or screws $n$ may be used, according to the different purposes the wheels may be required for. An ornamental tube $k$ is formed on the front disk $l$, and this is carried over the ordinary cap of the axle-box. The pieces $m$, formed on the outside of the back disk, Fig. 5, and radiating from the center of the hub, are intended to give additional strength to the projections $b$. The flange, Fig. 18, is riveted or may be cast with the tube $i$ in one piece, but it is only required when certain ordinary axles are used in conjunction with the wheels. The inside of the flange, Fig. 19, is cupped to receive and cover the washer found on ordinary mail-axles, which will be bolted to the flange, Fig. 19. The tube or pipe $i$ may be made to fit any axle or axle-box. The adjustable socket, Fig. 12, is fastened to the felly or rim $d$ by screws, rivets, or bolts and nuts.

Fig. 13 is secured by screwing the bolts $v$ through the felly or rim $d$ into the nut $w$, which is embedded in the felly or rim $d$ before the metallic tire $e$ is put on.

Fig. 4 is similar to Fig. 12, but is made wider at the part in contact with the joint $x$ of the felly $d$ for the purpose of putting in extra screws, rivets, or bolts and nuts, so as to give additional strength to the joints $x$ of the fellies $d$.

Fig. 7 is similar to Fig. 13, but it is secured to the felly or rim $d$ by screwing the bolt $v$ into it.

Fig. 9 is a plain socket with screw attached. The bolt $v$ is screwed into the felly or rim $d$, as in Fig. 7, and then the end $y'$ of the spoke $j$ is pressed into the socket $y$.

Fig. 10 is a plain socket into which the end $y'$ of the spokes $j$ is pressed. The corresponding plate $z$ is secured to the felly or rim $d$ by screws, rivets, or bolts and nuts. A hole is then bored the required depth in the felly $d$, and the bolt $v$ is then inserted into the said hole $z'$. When the end $y'$ of the spoke $j$ is fitted into the back sections of the adjustable sockets, Figs. 8, 11, 12, and 13, the rivet or bolt $p$ is driven through the spoke $j$ into the hole $q$. The hole $q^2$ is for an extra screw and such like to more firmly secure the sockets to the spokes $j$. The holes $q'$ are for the extra screws, rivets, or bolts and nuts to give additional strength to the joint $x$ of the felly or rim $d$. When all the sockets are secured to the fellies or rims $d$ and to the ends $y'$ of the spokes $j$, the remaining ends $y^2$ of the spokes $j$ are pressed into the back section of the hub, Fig. 19, between the wedge-shaped pieces $f$. The spike or peg $g$ is embedded in the back of the spokes $j$. A dovetailed mortise is formed between the wedge-shaped pieces $f$ for the spokes $j$, if required. When all the spokes are in position, the front disk, Fig. 15, is placed in position and the bolts screwed up tightly. A lubricator can be fitted to the tube $i$. A hollow metallic rim $e^2$ can be fitted to the sockets to receive an india-rubber tire $e'$.

As the parts, shapes, and materials may be varied in many ways within the scope of my invention, it will be clearly understood that I do not particularly bind myself to construct the wheels in the manner described herein.

Having now particularly described and ascertained the nature of my said invention and in what manner the same is to be performed, I declare that what I claim is—

A vehicle-wheel comprising a disk forming part of the hub, having the radial ribs to receive the end of the spokes between them, with the spikes between said ribs and with radial projecting arms to be secured to the spokes at points beyond the ribs and spikes, and a second disk to clamp the spokes, substantially as described.

In testimony that I claim the foregoing as my own I affix my name in presence of two witnesses.

WILLIAM THOMAS FAIZEY.

Witnesses:
GEORGE LESTER,
H. W. DENTON INGHAM.